(12) United States Patent
Osman

(10) Patent No.: US 11,153,203 B2
(45) Date of Patent: Oct. 19, 2021

(54) SYSTEM AND METHOD FOR ADAPTIVE TRAFFIC PATH MANAGEMENT

(71) Applicant: Sandvine Corporation, Waterloo (CA)

(72) Inventor: Alexander Osman, Dubai (AE)

(73) Assignee: Sandvine Corporation, Waterloo (CA)

( * ) Notice: Subject to any disclaimer, the term of this patent is extended or adjusted under 35 U.S.C. 154(b) by 0 days.

(21) Appl. No.: 16/575,580

(22) Filed: Sep. 19, 2019

(65) Prior Publication Data

US 2020/0112504 A1 Apr. 9, 2020

Related U.S. Application Data

(60) Provisional application No. 62/741,789, filed on Oct. 5, 2018.

(51) Int. Cl.
*H04L 12/721* (2013.01)
*H04L 12/26* (2006.01)
*H04L 12/851* (2013.01)
*H04L 29/12* (2006.01)

(52) U.S. Cl.
CPC ............ *H04L 45/34* (2013.01); *H04L 43/028* (2013.01); *H04L 47/2483* (2013.01); *H04L 61/256* (2013.01)

(58) Field of Classification Search
CPC .......................... H04L 47/2483; H04L 43/028
USPC ........................................................ 709/223
See application file for complete search history.

(56) References Cited

U.S. PATENT DOCUMENTS

| 8,051,206 B2 | 11/2011 | Paunikar et al. |
| 2002/0145981 A1 | 10/2002 | Klinker et al. |
| 2004/0004968 A1 | 1/2004 | Nassar |
| 2007/0038743 A1* | 2/2007 | Hellhake ........... H04L 29/12283 709/224 |
| 2010/0070623 A1* | 3/2010 | Sawada ............... H04L 61/2084 709/224 |
| 2011/0047256 A1* | 2/2011 | Babu ..................... H04L 61/256 709/223 |

(Continued)

FOREIGN PATENT DOCUMENTS

EP 2665335 A1 11/2013

OTHER PUBLICATIONS

European Patent Office, Extended European Search Report for 19198803.9—1215.

(Continued)

*Primary Examiner* — Vivek Srivastava
(74) *Attorney, Agent, or Firm* — Gowling WLG (Canada) LLP; Neil W. Henderson

(57) ABSTRACT

A system and method for adaptive traffic path management, the method including: receiving at least one packet associated with a traffic flow; determining application parameters associated with the at least one packet; determining attributes correlated with the traffic flow associated with the at least one packet; analyzing the application parameters and attributes to determine a Network Address Translation (NAT) pool for the traffic flow; determining if a modified NAT is needed based on the NAT pool for the traffic flow; if a modified NAT is needed, modifying the NAT for the at least one packet associated with the traffic flow; and sending the at least one packet and the traffic flow associated with the at least one packet to a path associated with the modified NAT.

16 Claims, 9 Drawing Sheets

(56) References Cited

U.S. PATENT DOCUMENTS

2012/0082073 A1* 4/2012 Andreasen .......... H04L 12/4633
370/310
2015/0350155 A1* 12/2015 Diaz ................... H04L 61/2514
370/235

OTHER PUBLICATIONS

European Patent Office, Communication pursuant to Article 94(3) EPC for 19198803.9—1215

* cited by examiner

SYSTEM AND METHOD FOR ADAPTIVE TRAFFIC PATH MANAGEMENT

RELATED APPLICATIONS

The present disclosure claims priority from U.S. Provisional Patent Application No. 62/741,789 filed Oct. 5, 2018, which is hereby incorporated herein by reference.

FIELD

The present disclosure relates generally to computer network traffic. More particularly, the present disclosure relates to a system and method for adaptive traffic path management and manipulation, sometimes also referred to as adaptive route management and manipulation.

BACKGROUND

Due to increasing bandwidth requirements of users, Internet Service Providers (ISPs) are in need of intelligent ways to efficiently manage their network traffic. ISPs are attempting to balance higher bandwidth demands with limited operating budgets while also improving subscriber quality of experience (QoE). As more subscribers access greater levels of content online, ISPs are frequently required to balance various demands to ensure subscribers' needs are being met. Balancing the demands may result in higher costs to the ISPs or lower quality of content to users. In particular, the traffic path taken by a particular traffic flow may affect not only the quality of the flow but also the cost of the flow for the ISP.

In a particular case, as ISPs continue to find ways to manage their Internet traffic, they may look to manage the Border Gateway Protocol (BGP) peerings more efficiently and wish to do so with more granularity. It is, therefore, desirable to provide an improved method and system for adaptive traffic path management.

The above information is presented only to assist with an understanding of the present disclosure. No determination has been made, and no assertion is made, as to whether any of the above might be applicable as prior art with regard to the present disclosure.

SUMMARY

In a first aspect, there is provided a method for adaptive traffic path management including: receiving at least one packet associated with a traffic flow; determining application parameters associated with the at least one packet; determining attributes correlated with the traffic flow associated with the at least one packet; analyzing the application parameters and attributes to determine a Network Address Translation (NAT) pool for the traffic flow; determining if a modified NAT is needed based on the NAT pool for the traffic flow; if a modified NAT is needed, modifying the NAT for the at least one packet associated with the traffic flow; and sending the at least one packet and the traffic flow associated with the at least one packet to a path associated with the modified NAT.

In some cases, modifying the NAT may include manipulating a source IP address of the at least one packet.

In some cases, the source IP of the at least one packet may be manipulated from a roaming IP address to a home IP address.

In some cases, modifying the NAT include manipulating a source port of the at least one packet In some cases, determining attributes correlated with the traffic flow may include determining attributes related to a subscriber associated with the traffic flow.

In some cases, determining application parameters may include performing deep packet inspection on the at least one packet.

In some cases, determining attributes correlated with the traffic flow may include determining attribute correlated to a cost to an operator of the traffic flow path.

In some cases, determining associated attributes correlated with the traffic flow may include determining whether there are any link failures in the traffic flow path.

In some cases, the method may further include: storing the modified NAT data associated with the at least one packet of the traffic flow; receiving at least one other packet associated with the traffic flow; retrieving the stored NAT data; and modifying the at least one other packet associated with the traffic flow based on the retrieved NAT data.

In some cases, determining application parameters associated with the traffic flow may include: decapsulating a header of the at least one packet, wherein the header comprises a source IP or source port of a subscriber; and modifying the NAT for the at least one packet may include: modifying the source IP or source port of the subscriber.

In another aspect, there is provided a system for adaptive traffic path management including: a traffic forwarding module configured to receive at least one packet associated with a traffic flow; an application recognition module configured to determine application parameters associated with the at least one packet; an attribute enrichment module configured to determine attributes correlated with the traffic flow associated with the at least one packet; a decisioning module configured to analyze the application parameters and attributes to determine a Network Address Translation (NAT) pool for the traffic flow and if a modified NAT is needed based on the NAT pool for the traffic flow; and a NAT module configured to modify the NAT for the at least one packet associated with the traffic flow if a modified NAT is needed.

In some cases, the NAT module may be configured to manipulated a source IP address of the at least one packet.

In some cases, the source IP of the packet may be manipulated from a roaming IP address to a home IP address.

In some cases, the NAT module may be configured to manipulate a source port of the at least one packet.

In some cases, the attribute enrichment module is further configured to determine attributes associated with a subscriber associated with the traffic flow.

In some cases, the application recognition module is configured to perform deep packet inspection on the at least one packet.

In some cases, the attribute enrichment module is further configured to determine a cost to an operator of the traffic flow path.

In some cases, the attribute enrichment module is further configured to determine whether there are any link failures in the traffic flow path.

In some cases, the system may be further configured to include: a memory component configured to store the NAT data associated with the at least one packet of the traffic flow; the traffic forwarding module is configured to receive at least one other packet associated with the traffic flow; a learning module is configured to retrieve the stored NAT data; and the NAT module is further configured to modify the at least one other packet associated with the traffic flowbased on the retrieved NAT data.

In some case, the application recognition module is further configured to decapsulate a header of the at least one packet, wherein the header comprises a source IP or source port of a subscriber; and the NAT module modify is further configured to modify the source IP or source port of a subscriber.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Figure 1:
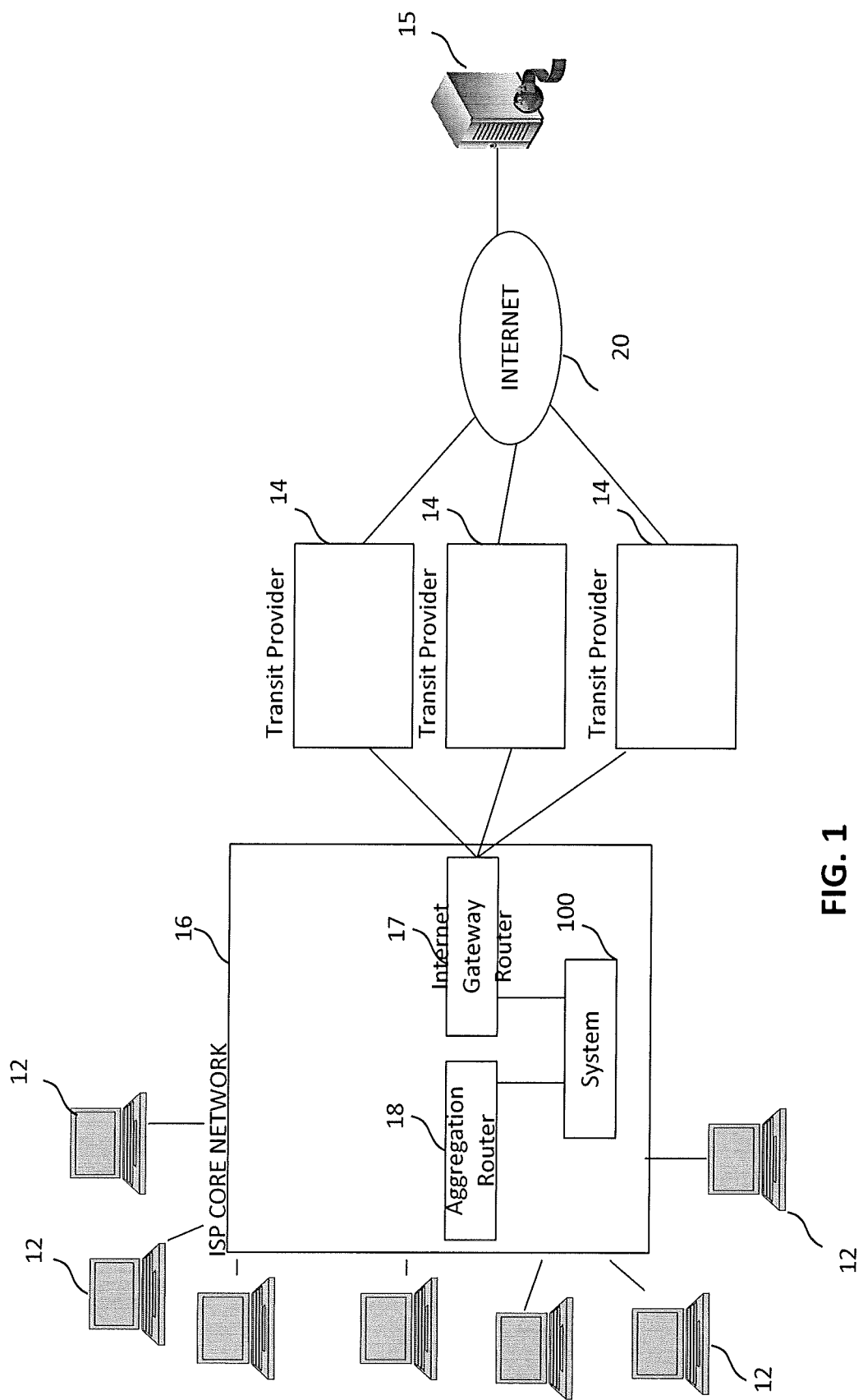
FIG. 1 is diagram illustrating a computer network architecture.

Generally, the present disclosure provides a method and system for adaptive traffic path management/manipulation including: determining path attributes; determining operator intent; determining characteristics of a traffic flow from at least one packet; manipulate a path of the at least one packet and/or traffic flow based on the path attributes; the operator intent and the traffic characteristics.

One of the challenges ISPs are facing is managing their Internet Border Gateway Protocol (BGP) relationships in a way that maintains a balance between subscriber Quality of Experience (QoE) and the cost to deliver content. Generally, ISPs are unable to enforce over which of their international uplinks specific downlink traffic should traverse on a flow by flow basis. As a result the ISP typically lack any ability to do so on a protocol by protocol basis.

Conventionally, ISPs are limited to controlling downlink traffic only on a subscriber IP subnet level, due to the fact that BGP advertisements are done on a subnet level and BGP is not a flow aware protocol. Subnets are advertised to provide for different subsets of nodes for a packet to travel from one location to another. It will be understood that as nodes may appear in a plurality of subsets, and there are various paths for a packet to travel in order to reach the correct content or location. As there are a plurality of options for each packet and as the BGP is not a flow aware protocol, human intervention is often needed to react to uplink failures or uplink congestion scenarios to re-engineer the BGP advertisements on an IP subnet level based on link utilization. In some cases, intervention may require manual reconfiguration of the BGP subnet advertisements on the Internet Gateway Routers to shift traffic from entire subnets from the congested links to less congested links. This typical scenario leads to higher operation expense in terms of human resources and uplink costs, as well as lower subscriber QoE.

Embodiments of the system and method described herein are intended to allow ISPs to perform real-time dynamic flow-level return path decisions based on traffic flow criteria, for example, application protocol, path quality (latency & drops), path cost, subscriber profile, path congestion, and the like. The system can change paths dynamically in real-time, whenever the path decision criteria changes, network environment changes, or other conditions change, without the need to change any BGP advertisement modifications and without the need for human intervention.

Embodiments of the system and method described herein may also be used in situations of high mobile roaming GPRS Roaming Exchange (GRX) costs and associated low QoE experienced by roaming subscribers. Conventionally, Mobile Operators do not have a way to break out high throughput, latency sensitive, or locally served applications for visiting roaming subscribers locally and have to send all the traffic back to the home operator to reach content on the Internet. Local Breakout in mobile data roaming scenarios may allow the visited operator not to send the roaming subscriber's traffic to the home operator and serving it locally, which will improve QoE and reduce cost for both providers since the traffic will not have to traverse the expensive links between the two mobile operators. Conventional solutions have generally been limited to either breakout all the traffic and serve it locally using the local GGSN bypassing the home network completely, or not break out at all.

Embodiments of the method and system described herein are intended to steer applications over BGP links that provide higher QoE and lower latency to the subscribers. In particular, it is intended that traffic flows may be more evenly distributed across BGP peers and will automatically react to BGP peer failures to provide redistribution amongst the remaining peers by steering new connections away from failed or congested paths. In this configuration, a Traffic Quality Measuring Module may be constantly tracking the BGP path quality per protocol based on it measuring the traffic flowing through the system. The Traffic Quality Measuring Module may further provide the Key Performance Indicators (KPIs) to a Decisioning Module as input for it to choose which BGP path may be best for which protocol. The Traffic Quality Measuring may further provide a Network Address Translation (NAT) pool decision to the NATing Module in order to choose the NAT pool per protocol flow that is only advertised on that chosen BGP link. The NATing Module may then NAT the packet/flow to that NAT pool and send the packet/flow to the Traffic Forwarding Module to send it out to the next hop in the network, which may be, for example an Internet Gateway Router. In the return path for the previously NATed flows, a Traffic Forwarding Module may send the packet to a Reverse NAT Module, which looks up or otherwise determines the NAT decision that was taken on the outgoing flow from the NATing Module. The Reverse NAT Module is intended to reverse the NAT to the original subscriber IP and sends the packet/flow to the Traffic Forwarding Module to go to the next hop towards the Subscriber, which may be, for example, an Aggregation Router.

FIG. 1 shows a diagram of a computer network architecture 10. Subscribers, using User Equipment 12, access content providers 15 over the Internet 20 via services provided by an ISP's core network 16. The ISP direct traffic to and receive traffic from a core network 16, which may then be directed to a transit provider 14 and the Internet 20. An ISP may connect to the core network 16, which may include a system for adaptive traffic path management 100. The system may be operatively connected to an Aggregation Router 18 and an Internet Gateway Router 17. Transit providers are other ISPs that could be connected to other ISPs which may be connected to the requested content. The Internet being a large interconnected web, leads to the existence of multiple paths towards the content through multiple ISPs (referred to as Transit Providers). Some Transit Providers may provide a better connection to the content than others in that the connection may be more cost effective or provide for higher quality content. Determining a path through the appropriate Transit Providers is intended to aid an ISP in obtaining their goals of cost and subscriber QoE.

Embodiments of the system and method described herein are intended to manipulate the traffic path on a per flow level with for example, Deep Packet Inspection (DPI) application awareness, subscriber attribute awareness, path quality awareness, path cost awareness, and the like, to make a decision on which route or path to take. The route or path may be manipulated by amending, for example, the source IP of the flow, which in turn modifies the path the flow will take based on existing predefined network route definitions per IP subnet. In some embodiments, the system is intended to use a combination of DPI and Network Address Translation (NAT) to manipulate the flow path as described herein. In some cases, where local roaming breakout may be used, the system may further make use of GPRS Tunneling Protocol User Plane (GTP-U) decapsulation. In some cases, the system may allow for the first few packets to flow through without any NAT amendments until the application is recognized. The system may then replay the initial flow packets towards the Internet with the NAT amended IP address while resetting the original flow towards the server. In some cases, where decisions can be made on the first packet of a flow, the system may apply a NAT to the flows immediately on the first packet.

Embodiments herein can be used to fulfill multiple use cases, for example, managing the traffic return path and breaking out roaming traffic. Managing the traffic path may be done based on policy, application or protocol, network conditions, network events or the like. In some cases, the manipulation of the traffic path may be based on capacity reasons, cost reason, quality reasons, or the like.

In some cases, manipulating the traffic return path dynamically, on a per flow basis, may be based on traffic flow criteria, for example:
 Application;
 Application real-time Quality per Route;
 Route real-time Quality;
 Route cost;
 Adapting to Route Failures;
 Subscriber Attributes (for example, Plan, Behavior, Payment, and the like);
 and
 Flow Attributes (for example, 5-tuples); and the like.

In some cases, dynamically breaking out roaming traffic, on a per flow basis, may be based on, the same or different traffic flow criteria, for example;
 Application;
 Application Quality;
 Application Hosting Locality; and
 Home Operator Roaming Agreement; and the like.

Other use cases may use similar or other traffic flow criteria in determining the traffic path for the flow. It is intended that the system determines, which flows to manipulate and what the best path is for that flow depending on, for example, the traffic flow criteria and the network operator's goal/intent. In some cases, the network operator may wish to achieve, for example, lower end-to-end latency, higher QoE for high value traffic, reducing costs by using cheaper paths for low value traffic, reducing OPEX by automating the reaction or path changes due to link failures, breaking out roaming traffic to reduce transit costs, upselling subscribers with dedicated high value links and the like. In some cases, the network operator may wish to achieve a combination of various goals. The system is intended to be configurable and it would be a matter of configuration with predetermined rules to achieve the operators' goals. In some cases, the system may have configurable if/else statements which would be comparing certain KPIs with certain values. In a specific example, the rule could be: if latency <50 then choose this link; if cost <$$ then choose that link; if subscriber is VIP then send over link with least latency, if not, then send on any other link or the like.

The system may be preconfigured with the operator's goal or intent as part of the configuration parameters of the system. The system may make a NAT selection that would send the packet or traffic flow over a link with the lowest latency if lower latency was the operator's goal.

In some cases, the system is intended to be configured to allow for the system to make the decision/determination on which path each specific flow should take based on, for example, the ISPs goals and the traffic flow criteria. In some cases, the system is further intended to provide for the ability to change the path of the flow after the flow has been established and the application has been recognized.

As shown in FIG. 1, the system 100 for application aware adaptive traffic path management is intended to reside in the core network 16. In particular, the system 100 may be an inline probe sitting with the ISP core network on the subscriber side of the Internet Gateway Router 17, or in another location where the system 100 is able to access the data noted herein. It will be understood that in some cases the system may be a physical network device, or may be a virtual networking device. In some cases, the system 100 may send data to the cloud to be processed or the system may process the data internally. It will be understood that sending data to the cloud relates to remote processing of the data by a remote processor using remote memory to at least temporarily store data related to the processing.

Generally speaking, an adaptive application aware traffic path manipulation system or method is intended to allow communication service providers to dynamically choose traffic paths (sometimes referred to as traffic routes) based on, and not limited to, application, subscriber, profile, path condition (application quality, path quality, path outage), path cost and the like. The traffic path may be selected by a method of selective Network Address and Port Translation (NAPT) on a flow by flow basis. Once a flow starts and meets the traffic flow criteria for taking a particular path (as previously determined), the flow will have NAT applied to it from the NAT pool associated with that path. If the flow does not match any criteria for any specific path, the flow may have NAT applied to it from the default NAT pool, or the flow may be allowed through without undergoing any NAT if the original source IP is a routable IP.

In an example of use case deployments, the system may be deployed near the Internet Gateway (IGW) routers of the ISP for International traffic return path manipulation or have a GTP based deployment on the Gp/S8 interface for local roaming breakout traffic path manipulation. In some cases, the system may further be implemented in other deployment forms/locations, for example, where flow based route manipulation is required in the form of maintaining multiple different NAT IP mappings for each internal IP on a flow level.

Traditional NAT solutions are designed with a purpose of preserving public address space, be it in simple NAT solutions, or intelligent NAT solutions, which dynamically select between NAT modes (NAT vs. NATP). These traditional solutions work with the concept of having a single public IP per private IP, where a public IP can have more than one private IP assigned to it in case of NATP. The proposed solution as detailed herein is intended to be geared towards intelligently assigning a single client to multiple NATP pools at the same time on a flow by flow level for the purpose of changing each flow's route to the best path for that flow based on the business requirements. This overcomes the limitation of having a single NATP association per private IP, which allows per flow public IP selection, and in return allowing per flow and per protocol routing manipulation leveraging existing pre-configured routing in the rest of the network.

Figure 2:
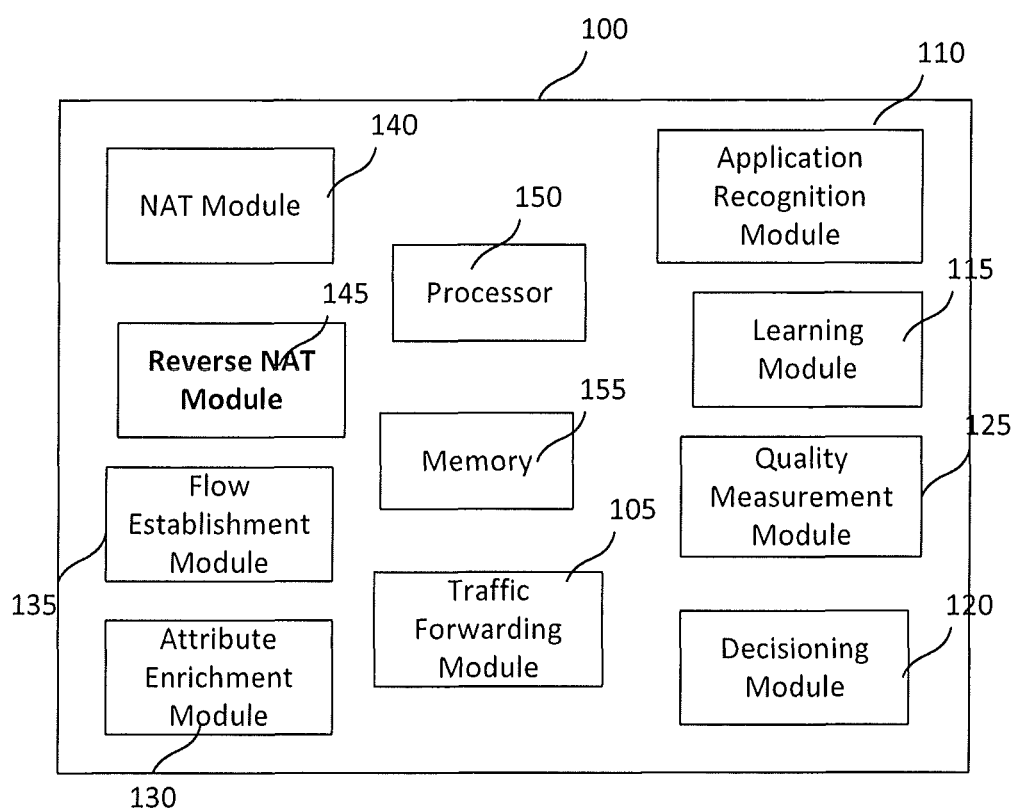
FIG. 2 illustrates an embodiment of a system for adaptive traffic path manipulation.

FIG. 2 illustrates an embodiment of the system 100 described herein. The system 100 can be considered an in-line traffic system made up of the following logical components, or modules:

Traffic Forwarding Module 105
Application Recognition Module 110
Learning Module 115
Decision (Logic) Module 120
Traffic Quality Measurement Module 125
Attribute Enrichment Module 130
Flow Establishment Replay Module 135
NAT Module 140
Reverse NAT Module 145

It will be understood that the solution further includes at least one memory component 155, configured to store data associated with the system. The system may further include a processing module 150, which may be distributed across various networking devices or may be a central processing unit for a single networking device. In some cases, the modules may be included in various modules which may be grouped together or may be in a distributed model. Each of the modules is generally in communication with the processor, memory and with appropriate other modules in order to perform their function.

Figure 3:
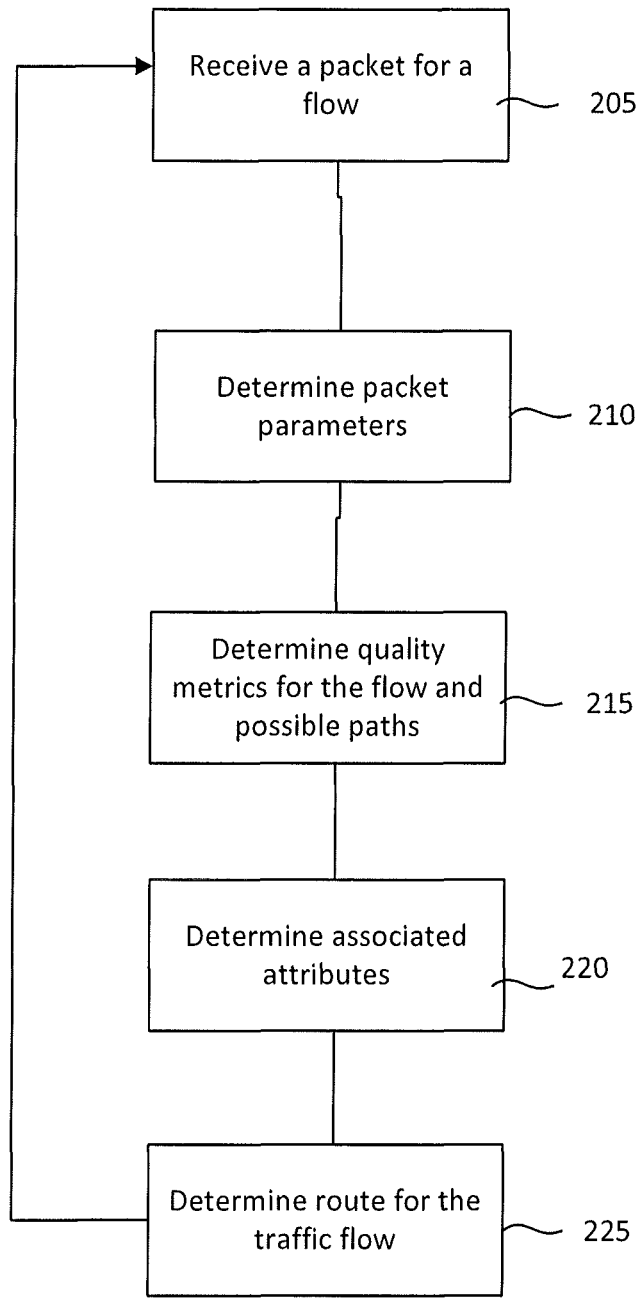
FIG. 3 illustrates an embodiment of a method for adaptive traffic path manipulation.

FIG. 3 illustrates an embodiment of a method 200 for adaptive traffic path management. The system 100 receives a packet from the traffic flow, at 205. Once the packet enters the system, the system is configured to determine traffic flow parameters associated with the packet and the traffic flow, at 210. Traffic flow parameters may be determined by the Application Recognition Module 110 with support from the Machine Learning Module 115 which is intended to provide flow and protocol related details and the Attribute Enrichment Module 130 which is intended to provide subscriber subscription information and identifying attributes. The subscriber information and identifying attributes may be, for example, behavior, VIP status, device used, and the like. The system further determines quality metrics for the flow and possible paths available to the traffic flow, at 215, via the Traffic Quality Measuring Module 125. The system may analyze the various paths in association with the network operator's predetermined goals and the traffic flow criteria, at 220. The Decisioning Module 120 concludes its decision based on the inputs determined by the other modules. The system may then manipulate the traffic flow parameters to vary the path for the traffic flow to a more suitable path according to the traffic path criteria and the network operator's goals, at 225. The Decisioning Module 120 may provide a decision to the NATing Module 140 with a chosen NAT pool and optionally triggers the Flow Establishment Replay Module 135 if the flow that will be NATed has already been established without NATing. The packet is then forwarded to the Traffic Forwarding Module 105 to send the traffic out of the system and into the network.

Figure 4:
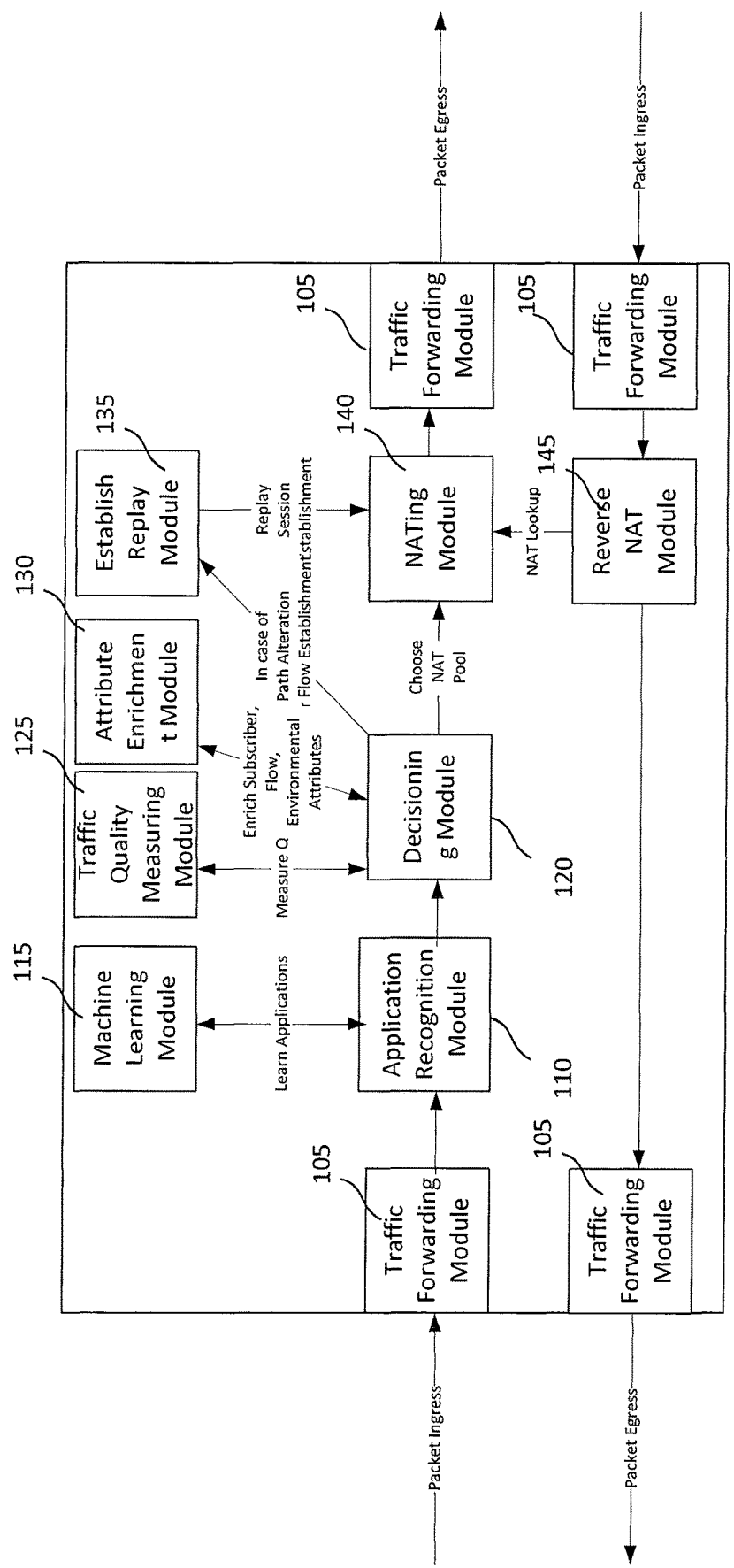
FIG. 4 illustrates traffic flow through an embodiment of a system for adaptive traffic path manipulation.

FIG. 4 illustrates the interaction between the modules of the system 100 in further detail. A packet is received by the Traffic Forwarding module 105. The Application Recognition module 110 may include a Deep Packet Inspection (DPI) engine, configured to perform deep packet inspection on each packet of the traffic flow. The Decision module 120 may include policy code that translates the network operator's business logic into decisions. In a specific example, the application may be WhatsApp calling, the system may determine to always send this type of traffic flow on the BGP peer that provides the lowest latency. Then the system will continuously monitor the latency for WhatsApp calls on all BGP paths and selects to NAT the WhatsApp call flows to the NAT pool that is advertised over the BGP path with the least latency In some cases, the operator's business logic may be configured upon the system's deployment. In other cases, this logic may be updated from time to time, manually or automatically.

The Traffic Quality Measurement module 125 is intended to measure the traffic quality while the Attribute Enrichment module 130 may link the knowledge of the subscriber to the logic and decision process, as described in further detail herein.

Traffic quality may be measured by the system, using open Key Performance Indicators (KPIs) such as latency, packet drops, and the like, and/or proprietary KPIs such as Application and Video QoE, and the like. The proprietary KPIs would include custom formulas and unique DPI insights that allow the measurement of the end user experience when consume content. Video QoE, for example, can be measured by monitoring Video Resolution changes in the video feed while the user is consuming, monitoring the number of buffer stalls where the video stalls waiting for new content from the server, and how long the video stalls, and the like. These metrics are then combined into an experience score using a proprietary formula and that score can be used as a criteria for choosing the BGP path that provides the highest score (for example, the best user experience for the end subscriber)

Subscriber attributes, such as subscriber information and identity, determined or retrieved by the Attribute Enrichment module 130 can help define the subscriber's profile, in order to prioritize the subscriber's traffic flow. In a specific example, if the operator's business logic is to send 'Gold' subscribers facebook traffic over a specific link, the system may rely on subscriber's profile to determine which subscriber is part of the 'Gold' group to determine which path to select.

The Traffic Forwarding Module 105 is responsible for receiving incoming packets and forwarding the packets back into the network. In some cases, this module may be a transparent bridging module such that the system will appear invisible to the network. In other cases, this module may be routing based, becoming a hop in the traffic path of the packet. In a physical deployment of the system where the network equipment is connected together via cables, a transparent box may bridge traffic from one port to the adjacent port. In the virtual world, it may be easier to be addressable in order to get the traffic through the cloud into the system for processing and then back out The Application Recognition Module 110 is configured to perform protocol recognition based on, for example, Deep Packet Inspection capabilities. The Application Recognition Module 110 may also inform the Learning Module 115 of the outcome of the protocol recognition and the traffic flow criteria of the recognized flow for faster future application inference from the first packet to avoid having to re-establish connections via, for example, the Flow Establishment Replay Module 135 for NATing purposes by the NAT Module. The system is intended to recognize various Internet protocols. Based on the operator's business logic, specific applications, determined based on the traffic flow criteria, may be of interest to the system and may have the traffic flow path amended to provide the traffic a better quality path.

The Learning Module 115 is configured to apply application inference for future flows. The Learning Module 115 may provide for application inference on the first packet instead of waiting for signature and pattern matching over multiple packets. The Learning Module 115 may maintain a short term dynamically updated recognition cache, which stores the destination IP/Port and Recognized Application from the Application Recognition Module 110 so that future flows during that short term cache can be recognized from the first packet (for path selection purposes). In some cases, the time the information is stored may be predetermined by the system. In other cases, the information may be stored until the Application Recognition Module 110 detects a different application and updates the cache. In some cases, the Learning Module 115 may store instantaneous DNS query results which is intended to allow for the upcoming flow with the DNS query parameters (for example destination IP, Port etc.) would be recognized on the first packet of the application flow, which commences after the DNS query. In some cases, the memory component of the system may store this data. It is intended that the Application Recognition Module 110 continues to perform recognition and update that cache as destination server IPs/Ports change in real-time. The system is intended to update the cache of the Learning Module 115 and recognize various protocols and applications.

The Traffic Quality Measurement Module 125 is configured to measure the Quality of Experience (QoE) of each flow and then grouping these quality metrics per unique grouping, for example by Application, BGP Path, Access Network, Subscriber, Plan, Home Operator, CDN, and the like. This grouping may be performed in order to maintain an up-to-date end-to-end view of the different network paths quality in order to feed this information into the Decisioning Module 120 or aid in determining whether a path change may be appropriate and take action. Quality metrics may include latency, packet loss, retransmissions, throughput, jitter, video buffer stalls, video buffer stall durations, video resolution upshifts, video resolution downshifts, and the like. New traffic flows may switch to new or different paths based on various results determined by the system. The system is intended to map paths in real-time to allow the Traffic Quality Measurement Module 125 to have quality metrics of all paths.

The Attribute Enrichment Module 130 may store attributes related to the traffic flow and packets within the traffic flow. The attributes may be related to subscriber profiles, traffic flow criteria, and the like. The Attribute Enrichment Module 130 may provide the to the decision module 120 for the decision process and logic implemented in the route selection. The Attribute Enrichment Module 130 may also include interfaces to external data sources that can act as data points in the decision process. The external data sources that may be queried by or interface with the Attribute Enrichment Module 130 may include, for example, Operator's IT Provisioning system, Operator's charging system, Operator's PCRF system, Operator's AAA server, and the like. These external data sources may provide attributes related to the subscriber, such as, subscriber entitlement, subscriber balance, subscriber policies, subscriber profiles and the like.

The Decision (Logic) Module 120 is configured to make a decision based on the packet attributes, for example, application, path quality, path cost, business rules, and the like. The Decision Module may determine which NAT pool the flow should be assigned to on a flow by flow basis. This decision is sent to the NAT Module to implement. In some cases, where the decision is made after the flow has already been established, the Flow Establishment Replay Module (FERM) 135 may be triggered to replay the flow establishment packets to the NAT Module 140. The system is intended to make a path determination almost instantaneously with the first packet of the traffic flow in order to direct the packet flow. In some cases, this is done by changing the source IP of the packet via the NATing process. The changed IP will be from a specific IP pool that is only advertised on one BGP path, the packet and/or the traffic flow will take that path back from the Internet instead of choosing another available path that may not be as appropriate given the operator's goals.

By dynamically changing the source IP of the packet to be from an IP pool that is only advertised on the BGP path selected for the traffic flow, the system is intended to be able to manipulate the traffic path. In some cases, the application or protocol of the traffic flow may not be known with the first packet and may be determined after a few packets have been reviewed by the system. In this case, once the protocol or application is recognized, the system may terminate the original flow and re-establish the flow transparently via the NAT to a more appropriate path given the operator's intended goals. In some cases, a source port may be manipulated as well of or instead of the source IP address.

The FERM 135 is configured to be called upon when NAT decisions occur a bit later in the lifetime of the flow and where the NAT criteria is protocol based and the Learning Module is not being used. In such a scenario, the FERM is intended to replay the initial flow packets towards the Internet server through the NAT process to re-establish the same connection via the new translated NAT IP transparently to the end user while terminating the previous flow. The FERM 135 may help create a new flow using a NAT'ed IP while transparently hooking it up to the existing subscriber side connection. This is intended to allow for NAT decisions to be made later in the flow's life, as a flow source IP may not be changed mid-flow as it may cause the connection to break.

The NAT Module 140 is where the flow network address translation happens and the NAT tables are maintained. The NAT tables are intended to hold information such as private IP/Port and public IP/Port mapping.

The Reverse NAT Module 145 is configured to review incoming packets from the Internet. The Reverse NAT Module 145 may verify with the NAT Module if a previous existing connection entry exists in the NAT tables in order to restore the destination IP of the packet from the public IP back to the private IP.

Figure 5:
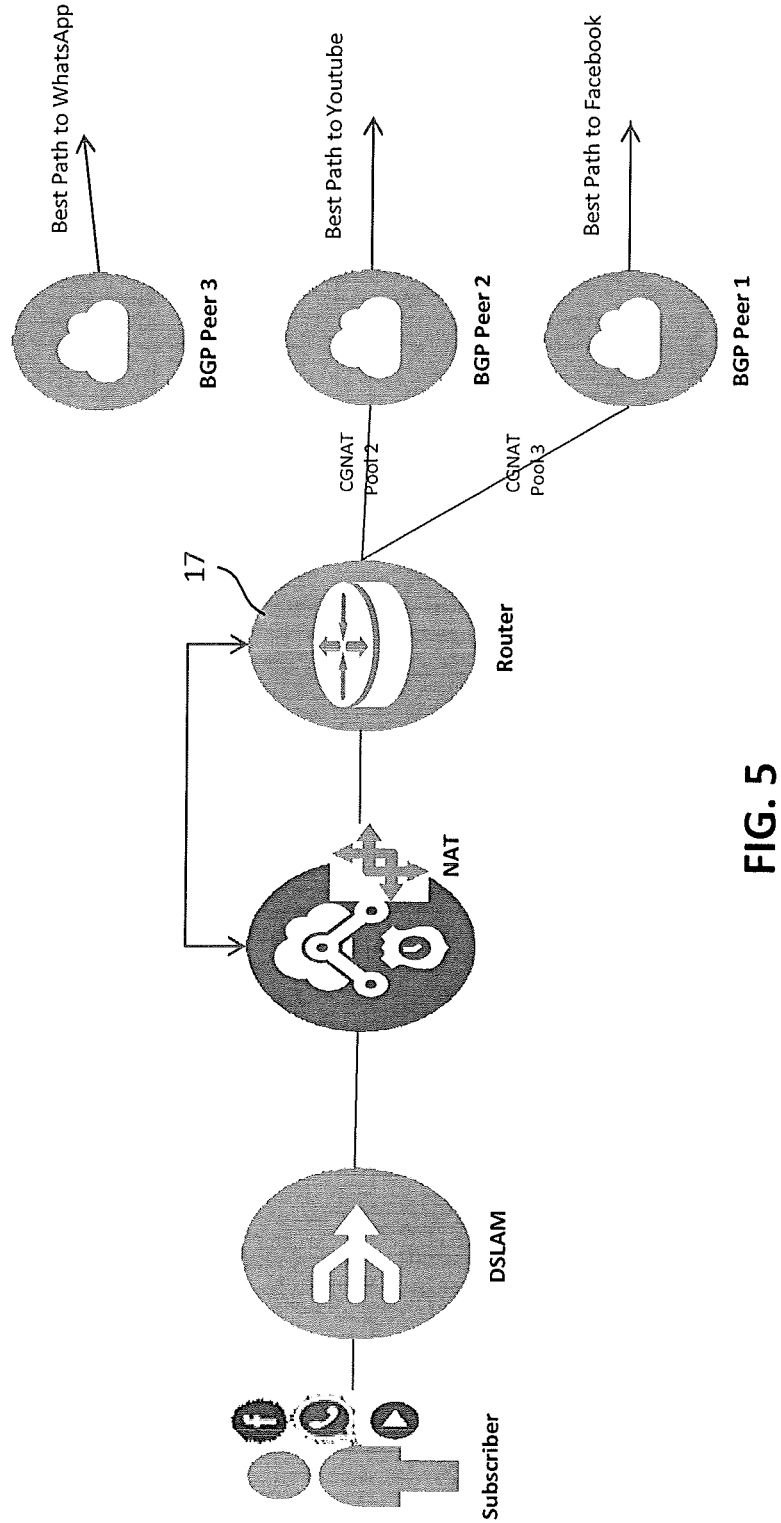
FIG. 5 illustrates an example use of the adaptive traffic path manipulation system according to an embodiment.

In a specific example as shown in FIG. 5, the system may to sit inline before the ISP's Internet Gateway (IGW) Routers 17. This may be used in the case of the BGP Path Manipulation use case as shown in FIG. 5. The system may have predetermined NAT pools defined equal to the number of uplink next-hops available to the operator deploying the solution. An ISP would provide public IP subnets that are to be advertised towards each BGP next-hop separately in order to have pools to be configured on the system. Each NAT pool may be advertised only to one uplink next-hop externally, while the standard subscriber assigned subnet would be advertised over all next-hops, as various BGP peer groups 305. The IGW 17 would be configured with all the subscriber pools (standard and NAT) towards the core router internally as the next-hop, or in the case where the system is IP addressable (for example, a virtual environment) then the IGW would be configured with the system's IP address as the next-hop internally. As the advertisement of each BGP peer group is fixed, the path may be considered predetermined for a traffic flow with a specific IP address, for example, a packet with a specific source IP may have a predetermined path through a peer group. As there are various subsets or each subnet, if the path is manipulated, by for example, changing the source IP address to belong to a separate peer group, the packet may travel though an alternative BGP peer group. In FIG. 5, the manipulation is intended to be based on the application used by the subscriber to allow the traffic flow to be manipulated to a path with better Quality of Experience (QoE).

The system is intended to select based on the outcome of the Logic Module 120 which NAT pool to use to provide a NAT to a new flow, thus manipulating the path the download traffic will take for this flow. In some cases, the system is intended to enable the operator to choose the path for each flow based on, for example, the application, the link quality, the cost of the link, the profile of the subscriber, the current utilization on the links, any existing cable cuts, or the like, enabling the operator to have an international traffic distribution that is configured to meet the operator intent or requirements. In some cases, this may be done during system deployment where the system is configured based on the operator's choices.

Figure 6:
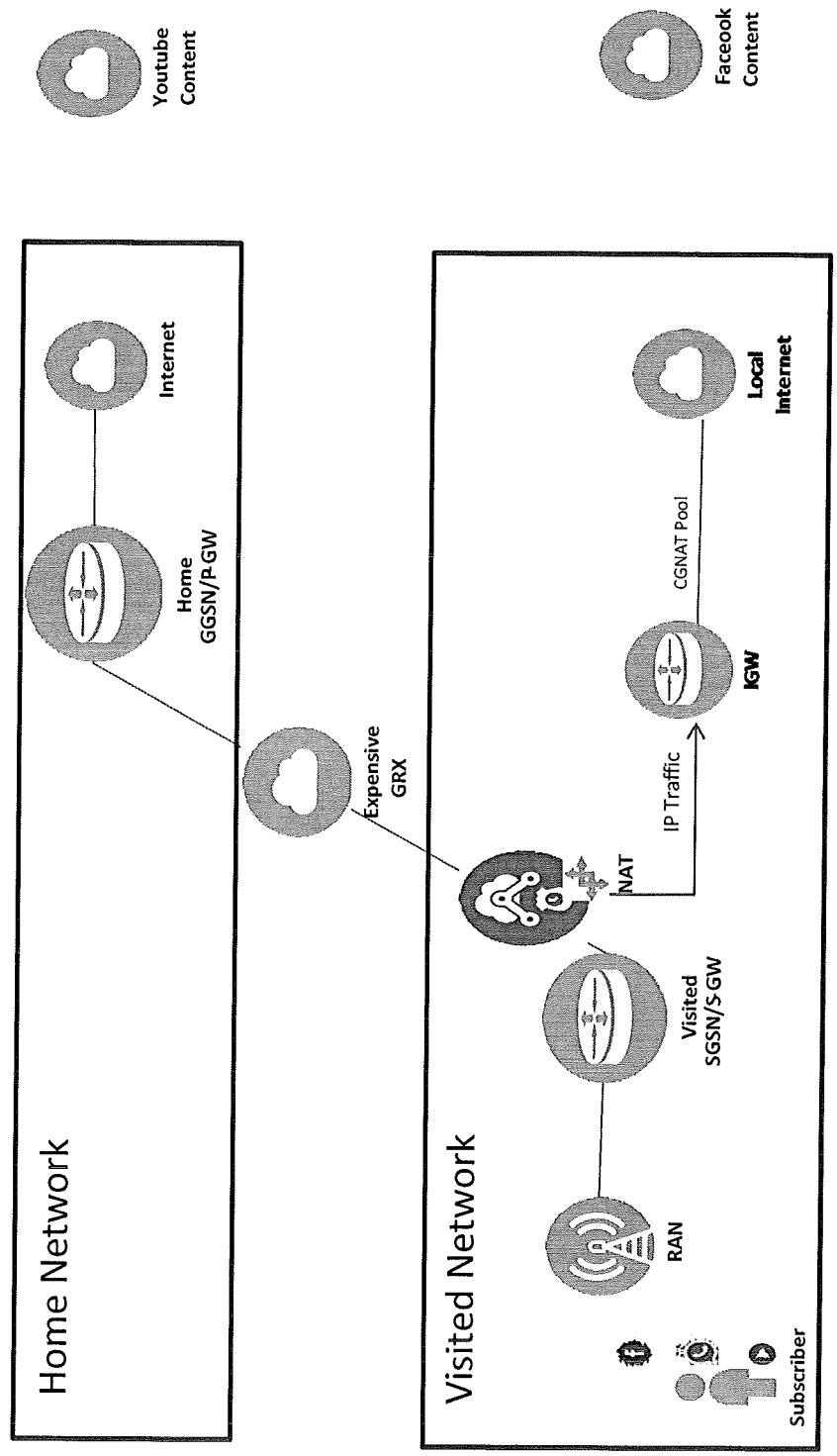
FIG. 6 illustrates another example use of the adaptive traffic path manipulation system.
Figure 7:
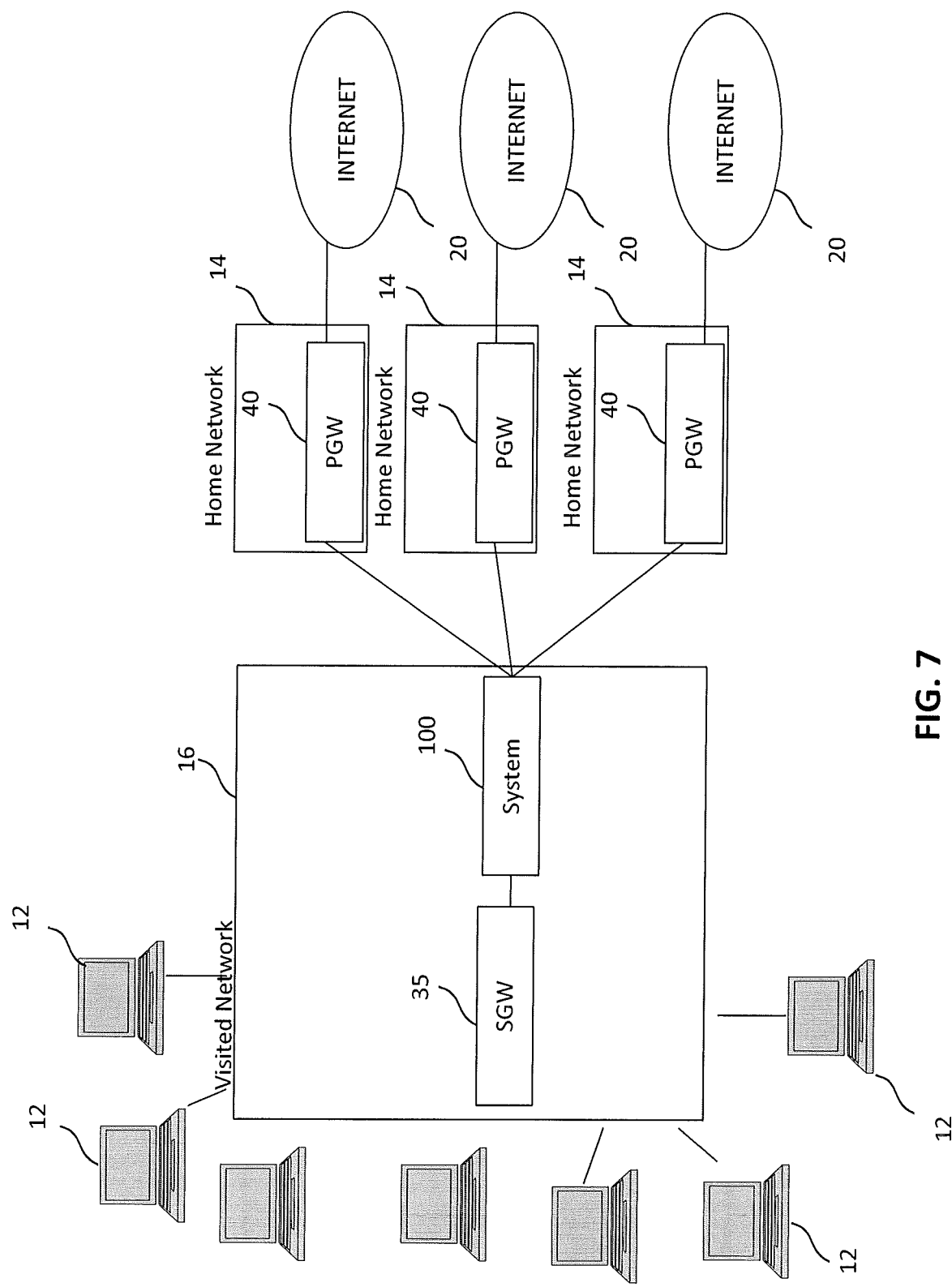
FIG. 7 illustrates an environment for the system in the example in FIG. 6.

It is intended that embodiments of the system and method detailed herein control downlink traffic as shown in the attached figures. In the case of, FIG. 6, an example is illustrated that is intended to allow breaking out 3GPP Mobile Roaming Traffic on the Gp/S8 interface and serving the traffic locally per Application. The system may manipulate both uplink and downlink traffic by changing the next hop for the uplink packet. The environment for this example is shown in greater detail in FIG. 7.

In an example, if a user 300 is roaming to a visited network 36, the traffic flows of the user 30 is received by a Serving Gateway (SGW) 35. The SGW 35 determines that the traffic is roaming and returns the traffic to a home network 14 of the user 30 in order to be reviewed by a Packet Data Network Gateway (PGW). It will be understood that network traffic travelling through international links can be costly, and if possible, may be better serviced if the traffic flow was able to be kept locally in the visited network 36. As such, the system is configured to determine if the traffic flow can be manipulated in order to be dealt with at the visited network. In particular, the path may include a NAT to a local source IP and then be sent to the Internet Gateway Router of the visited network 36 in order to avoid extra across seas flow. The system may decide whether to include a NAT to a local source IP on a flow by flow basis, and may select to do this action only on flows that may benefit from such a path change, for example, on high volume applications, latency sensitive applications, locally serviced application, or the like. In some cases, the system may manipulate a source port of the flow instead of the IP address.

Embodiments of the method described herein are intended to provide the ability to change the source IP of the subscriber packet based on the Downlink Path selected. The source IP change may be achieved using Network Address Translation (NAT).

Figure 8:
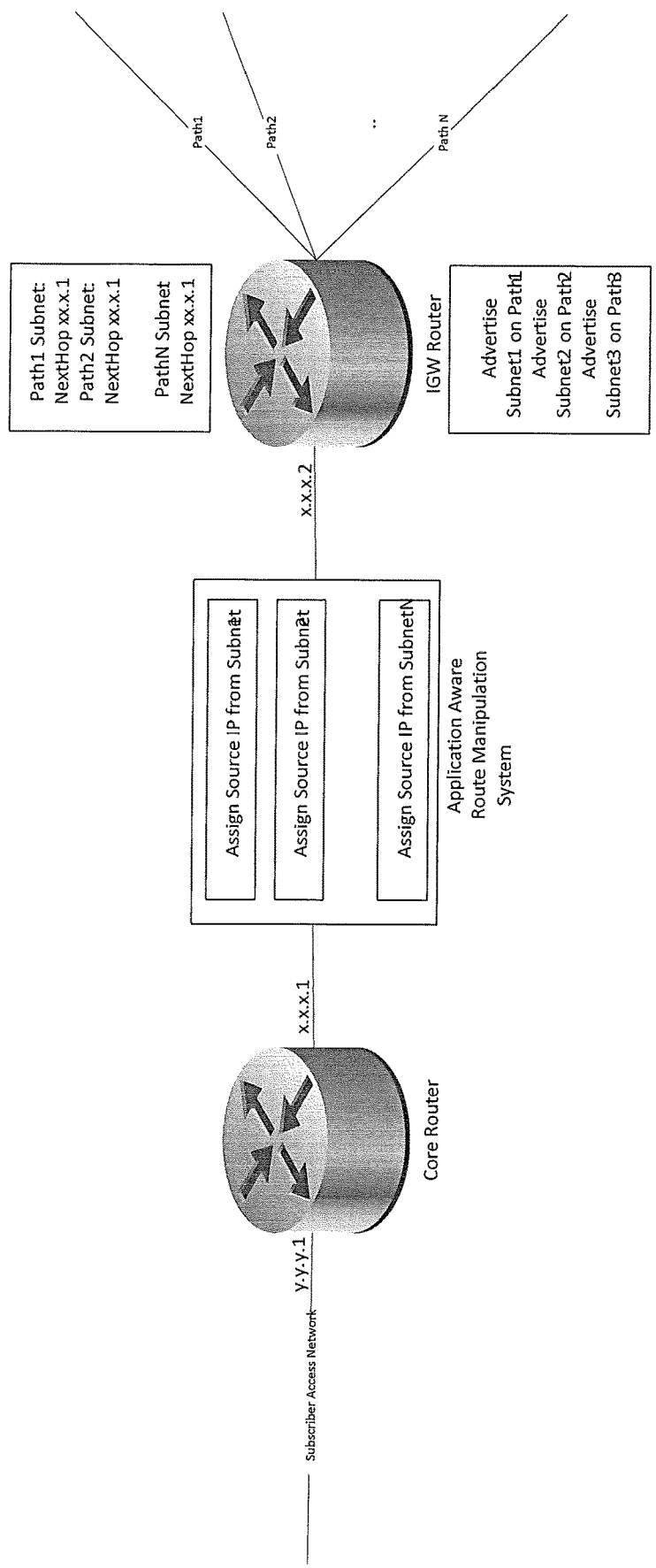
FIG. 8 illustrates an embodiment showing path manipulation between an Internet Gateway and Core Network.

FIG. 8 illustrates the system 100 in line between a core router and the IGW router. The NAT module is configured to change the source IP of the subscriber packet to be from one of the subnets defined based on the path selection decision. The Internet Gateway Routers of the operator would be advertising each NAT subnet separately to each BGP peer to which they are operatively connected. In a specific example, an ISP with only 2 BGP peers, will have 2 NAT subnets defined, and will advertise only one subnet to each peer. Subnet 1 to peer 1 and Subnet2 to peer 2. The system, based on the decision determined based on the method described herein, makes per traffic flow, change the subscriber source IP of that flow to be from one of those 2 NAT pools depending on which path the system has determined for the traffic flow.

In some cases, the system may decapsulate the GTP-U traffic (without requiring the decapsulation of the GTP-C) and changing the decapsulated source IP of the subscriber packet and the next-hop for that packet based on the Downlink Path selected. The path may be selected based at least in part on the QoE associated with the packet and the path as well as the application type of the packet and traffic flow. The system is configured to decapsulate GTP-U and then NATing the internal IP in the GTP-U tunnel in some cases, as opposed to the outer IP of the packet. This decapsulation may be used in a Mobile Roaming use case as detailed herein where the system may be deployed on the Gp/S8 interfaces between the visited SGW and home PGW, and this Gp/S8 interface is encapsulated in GTP-U.

Figure 9:
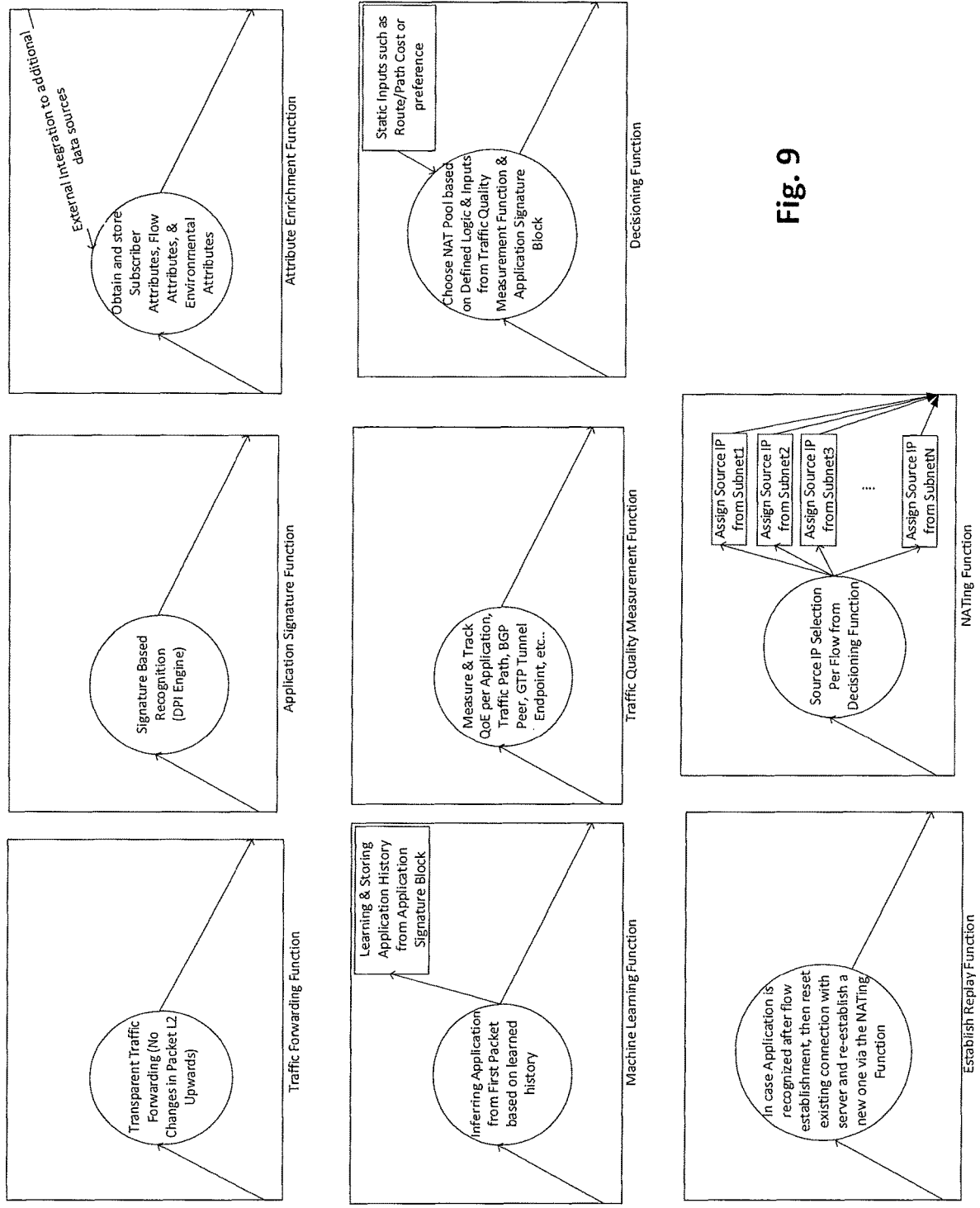
FIG. 9 illustrates various functions performed by various modules in embodiments of the system and method herein.

FIG. 9 illustrates a packet flow through the system 100 for adaptive traffic path management. It is intended that a packet is received by the traffic forwarding module 105. The system is intended to be transparent to the network, and does not make changes to the packet with respect to layer 2 information and upwards. The application signature module 110 performs deep packet inspection to determine the packet parameters, including, for example, application type, destination, source, and the like. The attribute enrichment module is configured to obtain subscriber, flow and environmental attributes associated with the packet and traffic flow. These environmental attributes may be simple attributes, for example, time of day, or other attributes which are visible to the system but not directly related to the traffic flow or subscriber. In other cases, the environmental attributes may be more complicated, and may be determined via interaction with, for example, RADIUS, LDAP, SOAP, REST, Diameter Gx, Diameter Gy, and the like.

The learning module 115 may infer the application from the packet parameters of the first packet on the flow based on previous flows and the information stored in cache. DPI is intended to be performed on the packets in addition to any inferred data that can be determined from the packet. If the system is able to infer sufficient data prior to DPI, the NAT decision may be determined prior to the Application Recognition module 110 recognizing the protocol via the protocol signature from the traffic flow. If the Application Recognition module 110 recognizes a different application or protocol than the one that was inferred from the cache in the learning module, it will update the cache and future flows will consider the new application parameters for the path selection and NAT decision The traffic quality measurement module is configured to measure and track the QoE per application, traffic path, BGP peer, GTP Tunnel Endpoint and the like. It will be understood that this tracking and measuring may be done in parallel with the other operations of the system.

The Decisioning module 120 is configured to select a NAT pool based on the packet parameters, the inferred application parameters, the QoE measurements, the external attributes and the like. In some cases, the Decisioning module 120 may further receive and analyze the path cost and include this further information in the NAT pool selection. The path cost is intended to represent how much the cost of that traffic path is to the operator and may be based on input received from the operator. Generally, the cost is determined as a cost in terms of volume consumed on the link, or peak bitrate that the link achieves during peak hours.

If the application is recognized after the flow has been established, the existing connection may be reset with the server and a new connection may be re-established via the NATing module 140 on behalf of the subscriber and stitched to the existing connection from the subscriber side. The NATing module 140 is configured to determine a source IP selection per traffic flow from the NAT pool received from the Decisioning module 120.

It is intended that the embodiments of the system provide the ability to change the source IP address of subscribers per Flow using NAT. If Application Recognition is performed using Deep Packet Inspection capabilities initially and may then be learned over time and inferred by keeping a sliding window of memory of all Applications recognized per Internet IP/Port and Protocol to allow for immediate NATing to be performed for future flows. This sliding window duration is intended to be configurable and may be in the range of 60 seconds. The sliding window may be fined tuned to suit the operator's network environment. In some cases, the system may be updated frequently by the Application Recognition Module 110 and the duration of the sliding window is intended to be sufficient in that the cache will not become stale or time out. It is intended that the sliding window will prevent unnecessarily storing parameters in memory when there is no traffic present for that application or protocol.

Embodiments of the system and method described herein are intended to provide for NAT post flow establishment (for example, after the protocol is recognized). In some cases, the system and method may terminate the server side of the connection and replaying the connection establishment using the NAT pool transparently to the end subscriber.

In order to maintain an updated view of the quality of each application for each BGP Next-Hop, the system may be configured to routinely NAT sample flows from all applications to other NAT pools than the ones they are configured to be NAT'ed to. This allows the system to collect QoE samples for paths that would otherwise have not been utilized by these applications. This also allows the system to detect if other paths have become more favorable for a specific applications and allow it to change its NAT Decisioning based on the updated QoE metrics for that application on that path. In some cases, this may allow the system to further determine if there are any paths, which include link failures or links that are overly congested. The system may manipulate the path of a traffic flow in order to reduce or eliminate any next-hop or path, which includes a link failure or an over congested link.

In some cases, the QOE may include aspects such as throughput, latency, jitter and loss associated with the traffic path or traffic flow Flow QoE metrics may be grouped together on a per path, per application, or the like. The QoE measurements may further include measuring Page Load Time, Buffer Stalls, Buffer Stall Durations, Video Resolution Upshift, Video Resolution Downshift.

Embodiments of the method and system described herein are generally intended to provide path selection on a flow by flow basis.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements therein described herein are implemented as a software routine, hardware circuit, firmware, or a combination thereof. It will be understood by one of skill in the art that elements of one embodiment may be used in other embodiments in appropriate circumstances. Further, each embodiment may not require all elements described, unless specifically stated as such.

Embodiments or elements therein can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for adaptive traffic path management comprising:
receiving at least one packet associated with a traffic flow;
determining application parameters associated with the at least one packet;
determining attributes correlated with the traffic flow associated with the at least one packet, wherein at least one attribute comprises a cost to an operator of the traffic flow path;
analyzing the application parameters and attributes to determine a current Network Address Translation (NAT) pool for the traffic flow and a current Border Gateway Protocol (BGP) path, wherein analyzing the parameters further comprises decapsulating a header of the at least one packet, wherein the header comprises a source IP or source port of a subscriber;

determining if a modified NAT is needed based on the NAT pool for the traffic flow;

if a modified NAT is needed, modifying the NAT for the at least one packet associated with the traffic flow, to a new NAT associated with a different BGP path, having different path attributes than the current BGP path, wherein modifying the NAT comprises modifying the source IP or source port of the subscriber; and sending the at least one packet and the traffic flow associated with the at least one packet to a path associated with the modified NAT.

2. The method according to claim 1, wherein modifying the NAT comprises determining a source IP and a subnet of the at least one packet; and manipulating the source IP address of the at least one packet to a source IP on a different subnet.

3. The method according to claim 2 wherein the source IP of the at least one packet is manipulated from a roaming IP address to a home IP address.

4. The method according to claim 1, wherein modifying the NAT comprises manipulating a source port of the at least one packet.

5. The method according to claim 1 wherein determining attributes correlated with the traffic flow comprises determining attributes related to a subscriber associated with the traffic flow.

6. The method according to claim 1 wherein determining application parameters comprises performing deep packet inspection on the at least one packet.

7. The method according to claim 1 wherein determining attributes correlated with the traffic flow comprises determining whether there are any link failures in the traffic flow path.

8. The method according to claim 1 further comprising:
storing the modified NAT data associated with the at least one packet;
receiving at least one other packet associated with the traffic flow;
retrieving the stored NAT data; and
modifying the at least one other packet associated with the traffic flow based on the retrieved NAT data.

9. A system for adaptive traffic path management comprising:
at least one processor connected to at least one memory storing instructions executable by the at least one processor to implement a plurality of modules comprising:
a traffic forwarding module configured to receive at least one packet associated with a traffic flow;
an application recognition module configured to determine application parameters associated with the at least one packet, wherein determining the parameters further comprises decapsulating a header of the at least one packet, wherein the header comprises a source IP or source port of a subscriber;

an attribute enrichment module configured to determine attributes correlated with the traffic flow associated with the at least one packet, wherein at least one attribute comprises a cost to an operator of the traffic flow path;

a decisioning module configured to analyze the application parameters and attributes to determine a Network Address Translation (NAT) pool for the traffic flow and a current Border Gateway Protocol (BGP) path for the traffic flow and if a modified NAT is needed based on the NAT pool for the traffic flow; and a NAT module configured to modify the NAT to a NAT associated with a different BGP, having different path attributes than the current BGP path, for the at least one packet associated with the traffic flow if a modified NAT is needed, wherein modifying the NAT comprises modifying the source IP or source port of the subscriber.

10. The system according to claim 9, wherein the NAT module is configured to determine a source IP and a subnet of the at least one packet; and manipulate the source IP address of the at least one packet to a source IP on a different subnet.

11. The system according to claim 10 wherein the source IP of the packet is manipulated from a roaming IP address to a home IP address.

12. The system according to claim 9, wherein the NAT module is configured to manipulate a source port of the at least one packet.

13. The system according to claim 9 wherein the attribute enrichment module is further configured to determine attributes related to a subscriber associated with the traffic flow.

14. The system according to claim 9 wherein the application recognition module is configured to perform deep packet inspection on the at least one packet.

15. The system according to claim 9 wherein the attribute enrichment module is further configured to determine whether there are any link failures in the traffic flow path.

16. The system according to claim 9 further comprising:
a memory component configured to store the modified NAT data associated with the at least one packet of the traffic flow;
the traffic forwarding module is configured to receive at least one other packet associated with the traffic flow;
a learning module is configured to retrieve the stored NAT data; and
the NAT module is further configured to modify the at least one other packet associated with the traffic flow based on the retrieved NAT data.

* * * * *